R. L. HIBBARD.
FLUID ACTUATED CLUTCH.
APPLICATION FILED MAY 27, 1912.

1,135,525.

Patented Apr. 13, 1915.
2 SHEETS—SHEET 2.

WITNESSES

INVENTOR
Robert L. Hibbard
by W. G. Doolittle
Attorney

UNITED STATES PATENT OFFICE.

ROBERT L. HIBBARD, OF SEWICKLEY, PENNSYLVANIA, ASSIGNOR TO RITER-CONLEY MANUFACTURING COMPANY, OF PITTSBURGH, PENNSYLVANIA, A CORPORATION OF NEW JERSEY.

FLUID-ACTUATED CLUTCH.

1,135,525.  Specification of Letters Patent.  Patented Apr. 13, 1915.

Application filed May 27, 1912. Serial No. 699,876.

*To all whom it may concern:*

Be it known that I, ROBERT L. HIBBARD, of Sewickley, in the county of Allegheny and State of Pennsylvania, have invented certain new and useful Improvements in Fluid-Actuated Clutches, of which the following is a specification.

An object of my invention is to provide a new and improved clutch, and more particularly a new and improved fluid actuated reversing clutch.

Figure 1:
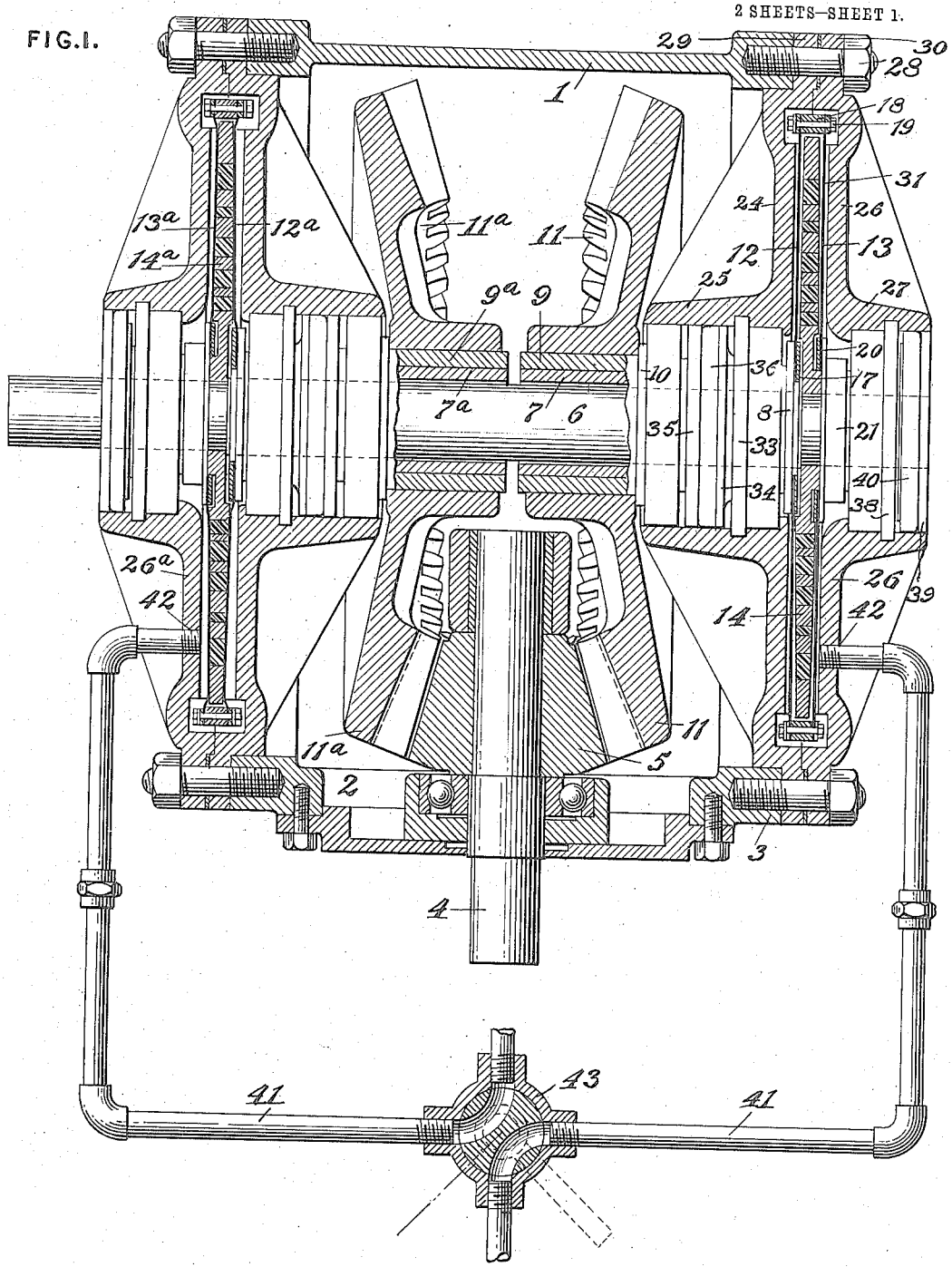
Figure 2:
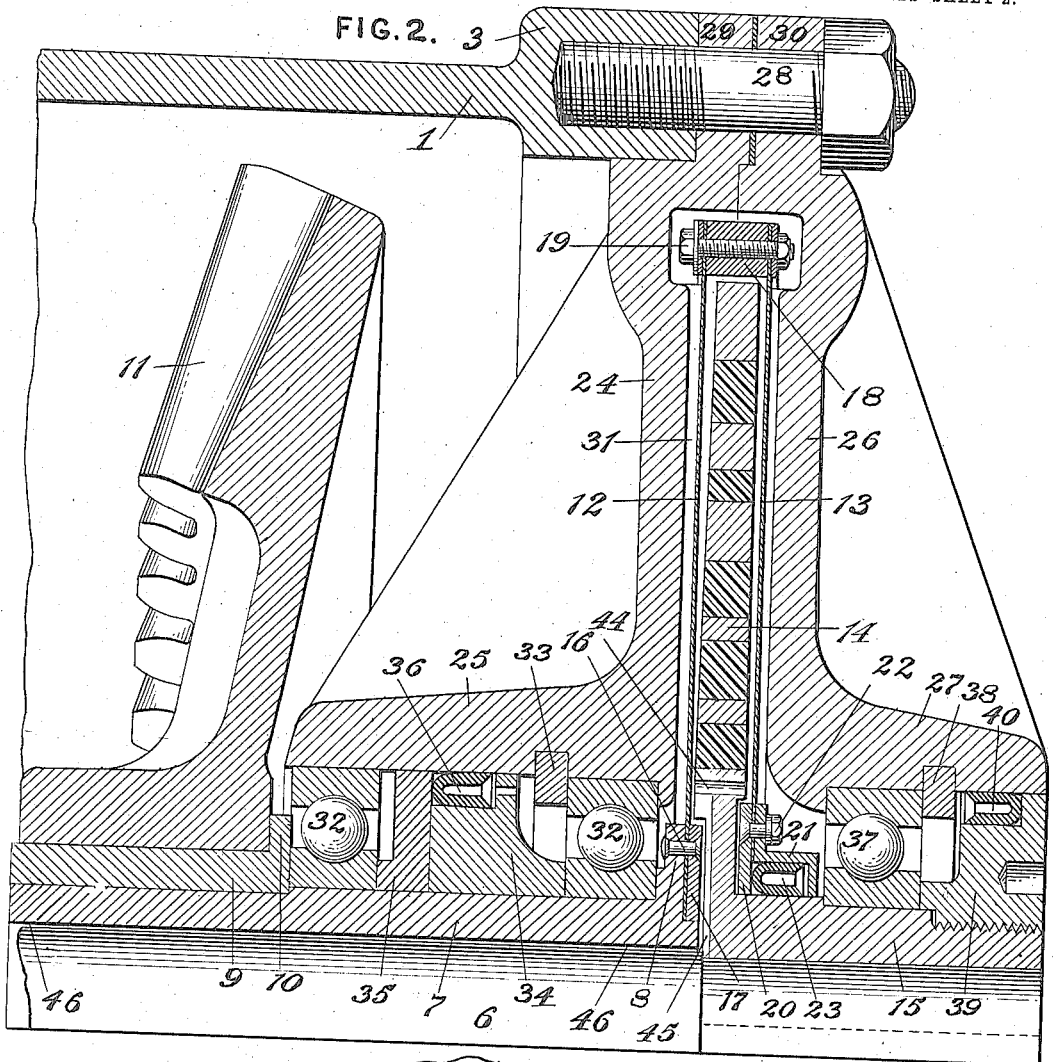
Figure 3:
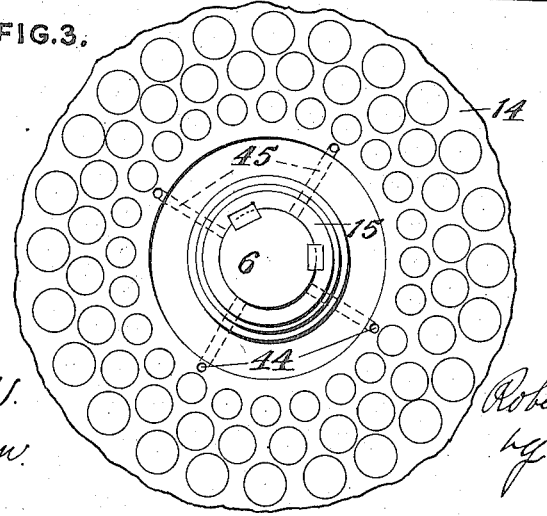

In the accompanying drawings, which illustrate an application of my invention, Figure 1 is a part elevational and a part longitudinal vertical sectional view of a clutch mechanism embodying my invention; Fig. 2, an enlarged detail vertical sectional view of a half of one end of the clutch mechanism; and Fig. 3, a detail side view of a portion of a clutch element employed, showing said element mounted on the driven shaft.

Referring to the drawings, 1 designates a metallic tubular casing formed with an opening 2 and having its ends each provided with an annular flange 3 tapped to receive threaded bolts.

4 designates a power shaft extending into the casing and provided with a gear 5, and 6, a driven shaft disposed at an angle with the power shaft 4. On the driven shaft 6, I provide two sets of coöperating parts, each constituting one-half of the clutch mechanism, and each set including a loosely mounted driven element, a clutch element rigid with the shaft, flexible diaphragms connected with the driven element and designed to coöperate with the clutch element, together with other coöperating parts; and, as said elements or parts of each set correspond with similar elements of the other set, it is believed that the invention will be fully understood if a detail description is directed more fully to one-half of the clutch mechanism than it is to the other half.

Loosely mounted on the driven shaft 6, I provide bushings or sleeves 7 and $7^a$, with each of said bushings formed with a flanged end as shown at 8. Surrounding a portion of the respective bushings 7 and $7^a$ are short bushings 9 and $9^a$ each provided with an inner flange 10. These latter bushings are keyed to the said bushings 7 and $7^a$, and mounted on and keyed to each of the short bushings 9 and $9^a$ are the respective driven elements, as illustrated, gear wheels 11 and $11^a$ adapted to mesh with the gear 5 of shaft 4 and be rotated in opposite directions by the shaft 4. These loosely mounted gear wheels 11 and $11^a$, or driven elements, are respectively connected with diaphragms 12, 13, and $12^a$, $13^a$, said diaphragms are preferably flexible and are disposed on opposite sides of clutch members 14 and $14^a$.

Each of the clutch members or elements 14 and $14^a$ has a centrally disposed opening and a hub portion 15, the latter designed to be keyed to the driven shaft 6. The respective diaphragms 12 and $12^a$ are secured to the flanges 8 of the sleeves 7 and $7^a$ by means of rivets 16, as particularly shown by Fig. 2.

17 designates annular rings employed in connection with the flanged ends 8 of the sleeves for clamping the diaphragms 12 and $12^a$ between them, the rivets 16 being passed through said rings and the flanged ends 8.

Encircling each of the clutch elements 14 and $14^a$, is a ring 18, and to each of said rings 18 the peripheries of the diaphragms 12 and 13 are secured by means of bolts 19.

20 designates a ring loosely mounted on the hub portion 15 and designed, in connection with an annular flanged member 21, for clamping the central portion of the diaphragm 13 therebetween, and 23 a series of rivets passing through the ring 20 and a flange of the member 21. Located within the flanged member 21, I provide a U-shaped leather 23. The diaphragm being connected with the sleeves 7 and $7^a$, as described, rotates therewith as said sleeves are rotated by the driven elements 11 and $11^a$, which latter in turn mesh with and are driven by the power shaft gear 5.

Secured to the annular flanges 3 at each end of the casing, and closing the ends thereof, I provide an inner circular plate member 24 having a hub portion 25 and an outer circular plate member 26 having a hub portion 27. These respective members are secured to the annular flanges 3 of the casing by means of a series of bolts 28 passed through flanged portions 29 and 30 of the respective members. Said members 24 and 26 are designed to interlock and, when assembled, form between the members an annular fluid chamber 31.

Interposed between the interior hub surface of hub 25 and the sleeve 7, I provide roller bearings 32, said bearings being maintained in the desired position between flanged end 8 of sleeve 7 and the flanged end 10 of sleeve 9 by means of a split ring 33 and annular spacing members 34 and 35. Member 34 is provided with a recess on its periphery to receive an annular U-shaped leather 36 designed to prevent fluid escaping from the fluid chamber 31 in the direction of the driven member 11.

Located between the hub portion 15 of the clutch member 14 and the hub 27 of the outer member 26, is a roller bearing 37 for hub 15 of the clutch member, said bearing being maintained in the desired operative position by means of a split ring 38 and an internally threaded bushing 39, the latter being secured to a threaded portion of the hub 15. 40 designates a U-shaped leather designed to prevent the escape of fluid from the fluid chamber.

The actuating fluid is supplied to the interior of the fluid chamber 31 from a suitable source of supply, not shown, by means of piping 41 having the ends thereof entered through openings 42 formed in the outer members 26 and 26ª.

43 designates a four-way valve mechanism for permitting fluid to be alternately supplied to and exhausted from opposite ends of the clutch mechanism.

Fluid under pressure being supplied to the fluid chamber located at one side of the clutch mechanism will cause the rotating flexible diaphragms to clasp the circular portion of clutch member 14, thereby carrying said member 14, together with the shaft 6, in the direction of rotation of the driven member 11. To reverse the rotation of driven shaft 6, fluid is exhausted from the fluid chamber 31 causing the diaphragms to release the clutch member 14. Simultaneously with the exhaust of fluid from chamber 31, fluid under pressure is admitted to the chamber on the opposite end of the clutch mechanism, thereby causing the diaphragms 12ª and 13ª to clasp the clutch member 14ª and to rotate the shaft in the direction of the travel of the driven element 9ª.

To maintain atmospheric pressure at all times between the diaphragms 12 and 13 and 12ª and 13ª, I provide a series of ports 44 and a series of radial grooves 45, the latter being in communication with the annular space 46 located between the shaft and the sleeve 7.

What I claim is:—

1. In a clutch, the combination with a rotary shaft, of a driven element loosely mounted on the shaft, a clutch element rigid with the shaft, a diaphragm connected with the driven element and coöperating with the clutch element, and means for supplying fluid under pressure to the diaphragm, said shaft and driven element being held against relative endwise movements.

2. In a clutch, the combination with a rotary shaft, of a fixed casing having a fluid chamber, a driven element loosely mounted on the shaft, a clutch element rigid with the shaft located in the fluid chamber, a diaphragm connected with the driven element located in the fluid chamber and coöperating with the clutch element, and means for supplying fluid under pressure to the fluid chamber.

3. In a clutch, the combination with a rotary shaft, of a driven element loosely mounted on the shaft, a clutch element rigid with the shaft, a fixed casing having a fluid chamber, said clutch element located in the fluid chamber, flexible diaphragms within the fluid chamber and located on opposite sides of the clutch element, said diaphragms coöperating with the clutch element, and means for supplying fluid under pressure to the fluid chamber.

4. In a clutch, the combination with a rotary shaft, of a driven element loosely mounted on the shaft, a clutch element rigid with the shaft, a fixed casing having a fluid chamber, said clutch element located in the fluid chamber, flexible diaphragms within the fluid chamber and located on opposite sides of the clutch element, said diaphragms movable with the driven element and coöperating with the clutch element, and means for supplying fluid under pressure to the fluid chamber.

5. In a clutch, the combination with a rotary shaft, of a sleeve loosely mounted on and held against endwise movement relative to the shaft, a driven gear rigid with the sleeve, operable means for driving the gear, a clutch element rigid with the shaft, a diaphragm connected with the sleeve and coöperating with the clutch element, and means for supplying fluid under pressure to the diaphragm.

6. In a clutch, the combination with a rotary shaft, of a driven element loosely mounted on the shaft, operable means for driving the driven element, a clutch element rigid with the shaft and including a disk-like portion and a hub portion, flexible diaphragms arranged on opposite sides of and coöperating with the disk-like portion of a clutch element, and means for supplying fluid under pressure to the diaphragm.

7. In a reversing clutch, the combination with a rotary shaft adapted to be driven, of spaced driven elements loosely mounted on the shaft, spaced clutch elements rigid with the shaft, a pair of fixed casings each having a fluid chamber, flexible diaphragms located in each of the fluid chambers and disposed on opposite sides of each clutch element, said diaphragms being fixedly connected to the driven elements, and means connected to the casing for supplying fluid under pressure from a common source to the fluid chambers to force the diaphragms into engagement with the clutch elements, and an inclosing member connecting the casings.

8. In a reversing clutch, the combination with a rotary shaft, of spaced driven elements loosely mounted on the shaft, spaced clutch elements rigid with the shaft, a pair of fixed casings each having a fluid chamber, flexible diaphragms located in each of the fluid chambers and disposed on opposite sides of each clutch element, said diaphragms being fixedly connected to the driven elements, and means connected to the casings for supplying fluid under pressure to one set of diaphragms and for effecting an exhaust from the other set of diaphragms, and an inclosing member connecting the casings.

9. In a clutch and in combination, a driven shaft, a fixed casing having a fluid chamber, a constantly driven element mounted on the shaft and adapted to act as a driving element for the shaft at will, coöperative clutch elements within the chamber fixedly connected respectively with the driven element and the shaft, and means for supplying fluid under pressure to the fluid chamber whereby the shaft and said driven element may be operatively connected together within the chamber.

10. In a clutch, the combination with a rotary shaft, of a fixed casing having a fluid chamber, a driven element and a clutch element mounted on the shaft, one of said elements being loose and the other rigid on the shaft, a diaphragm located in the fluid chamber and coöperating with the driven element and the clutch element, and means for supplying fluid under pressure to the fluid chamber.

11. In a reversing clutch and in combination, a driven shaft, spaced apart fixed casings through which said shaft extends, each casing having a fluid chamber connected to a source of fluid pressure supply, means for controlling the supply to either chamber at will, a drive member, and independent axially alined clutch mechanisms intermediate the drive member and the shaft, each mechanism including coöperative clutching elements, each chamber being adapted to receive the clutch elements of one of the mechanisms, the clutching elements of a casing being rendered active by the fluid pressure introduced therein, whereby the shaft may be rotated in either direction from a single power source at will, and an inclosing member connecting the fixed casings.

In testimony whereof I affix my signature in presence of two witnesses.

ROBERT L. HIBBARD.

Witnesses:
W. G. DOOLITTLE,
F. E. GAITHER.